Patented June 3, 1952

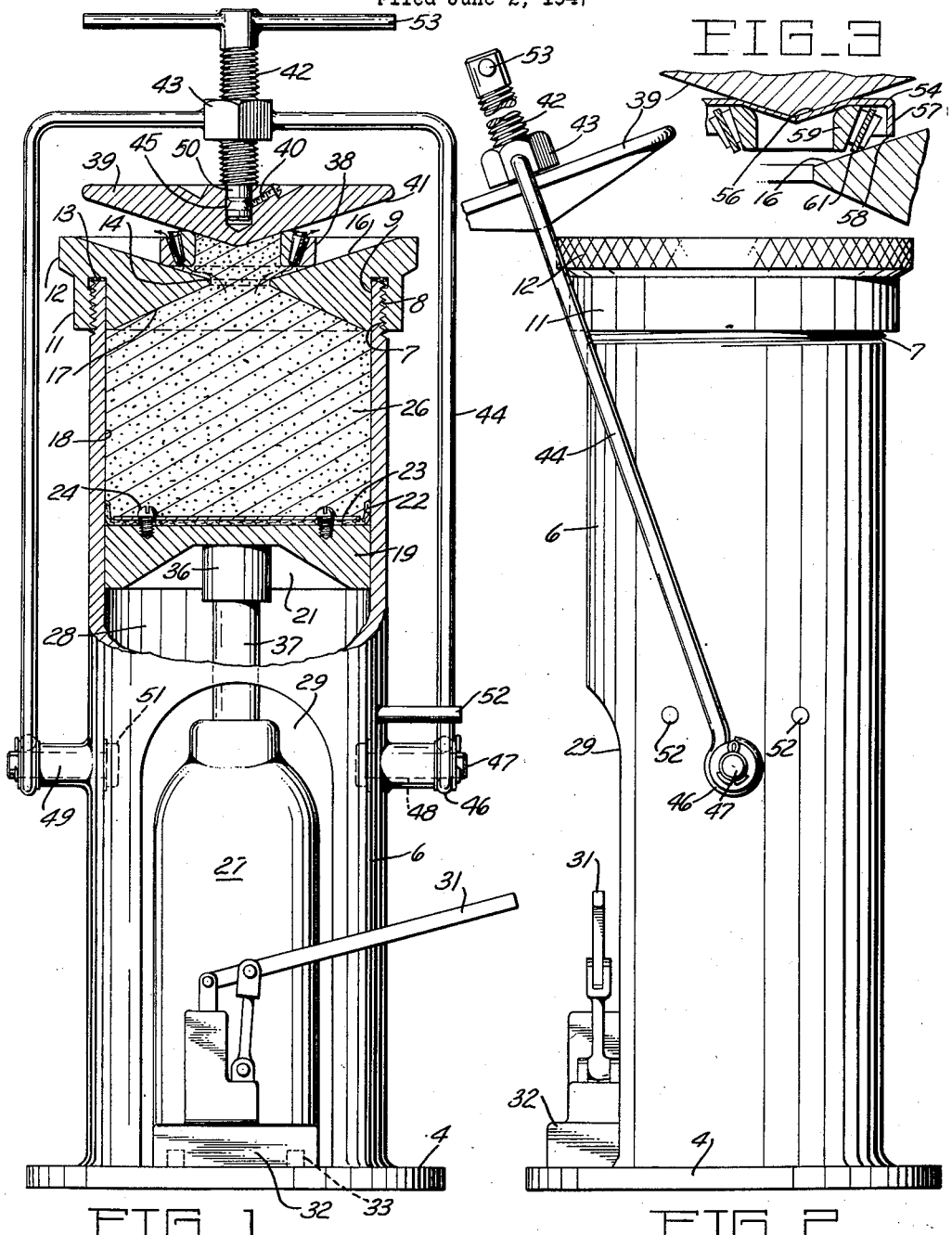

2,599,456

UNITED STATES PATENT OFFICE 2,599,456

GREASING APPARATUS

Roger G. Ivie, Oakland, Calif.

Application June 2, 1947, Serial No. 751,883

2 Claims. (Cl. 184—1)

This invention relates to pressure actuated devices for dispensing grease or the like viscous substances.

An object of the invention is to provide apparatus designed particularly for packing with grease bearings of the ball or roller types.

Another object of the invention is to provide apparatus of the character described adapted to forcibly dispense grease regardless of the degree of viscosity thereof and to accommodate a wide variety of sizes and types of bearings.

A further object of the invention is to provide pressure apparatus of the type referred to adapted to deposit applications of grease by virtue of circuitous flow of the latter internally and externally of the cage member employed to maintain the balls or rollers of the bearing in peripherally spaced interrelation.

Still another object of the invention is to provide a pressure dispenser, for charging bearings with grease, which is designed to function with and to derive operational power from a standard jack which may be of the screw elevating type but which is preferably of the hydraulic class.

Yet another object of the invention is to provide a device of the character described which is comparatively compact and light in weight and which will reduce wastage of grease, now a common occurence in the grease packing of bearings, to an absolute minimum.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a view, partly in front elevation and partly in vertical section, of the greasing apparatus of my invention showing a bearing mounted therein and in process of being grease packed.

Figure 2 is a side elevational view of the structure shown in Figure 1. A portion of the view is broken away to provide proper clearance between the views.

Figure 3 is a portional vertical sectional view of the apparatus showing the attachment for effecting greasing of a bearing both internally and externally of the bearing cage.

In the form in which I have chosen to illustrate my invention, I provide a base plate 4, preferably a section of steel boiler plate to which is attached in any suitable manner such as by welding, an axially-vertical tubular body 6 which, for all intents and purposes, may be constructed of a section of standard iron pipe. The outer surface of the upper end of the body 6 is preferably provided with screw threads 7 which are engageable with the mating threads 8 provided in the outer peripheral surface of an annular recess 9 formed in a cap 11, the mating threads 8 provided in the outer peripheral surface of an annular recess 9 formed in a cap 11, the latter being thereby detachably mounted on and forming a closure member for the upper end of the body 6.

Means for facilitating application or removal of the cap may comprise a peripheral bead portion 12 which may be knurled as shown for providing a manual grip or which may be of polygonal or other form to facilitate connection to the cap of a wrench or other applicator tool. A gasket 13, or its equivalent, is provided in the recess 9 and is interposed between the confronting faces of the recess bottom and the end of the tubular body so as to provide a fluid-tight seal. A preferably circular port 14 is formed centrally of the cap 11 and the latter is further provided with upper and lower recesses 16 and 17 respectively which are each of conical form and which expand radially outwardly from the periphery of the port 14.

The inner bore 18 of the body 6 is machined to a smooth finish and forms a sliding surface for a snugly fitting piston 19 having a coaxial recess 21 in its lower end and provided with a cup leather 22 secured to its upper end by an overlying disk 23 attached to the piston by screws 24 or other means. The space internally of the body 6 between the piston 19 and the cap 11 forms a chamber in which a quantity of grease 26 to be dispensed may be placed to be forced through the port 14 by upward movement of the piston. Such upward movement of the piston is designed to be forcibly effected by a jack 27 of such size as to permit its insertion into the body space 28 below the piston through an opening 29 cut in the wall portion of the body. The jack 27, under conditions wherein a comparatively low pressure will meet the need, may be of the screw thread type but it is preferred to use a hydraulic jack as shown which is of such construction that its operating lever 31 will extend exteriorly of the body 6 to a point wherein it will be within convenient reach for the operator. The base 32 of the jack is modified in that it is provided with one or more downwardly opening recesses 33 for receiving mating dowel pins 34 carried by the base plate 4 so as to anchor the jack to the base plate. The cap or pressure pad 36 of the extendible jack ram 37 is received in the piston recess 21 so as to effect operative connection between the jack and piston. It will be seen that by actuating the jack 27, the piston 19 will be forcibly elevated thereby forcing grease 26 from the chamber upwardly through the port 14. It will be further seen that the upwardly converging surface of the lower cap recess 17 will cause grease to flow inwardly toward the port from the radially remote portions of the grease chamber.

Means is provided for holding an article to be grease-packed in relation to the port 14 to receive the flow of grease issuing therefrom. The concavity of the recess 16 provides a socket for receiving bearings 38 of the ball or roller type within a range of diametral sizes extending from slightly in excess of the diameter of the port 14 to the outer perimeter of the recess. A clamp plug 39 having a conical portion 41 complementary with the recess 16 is positionable above the latter with the apex of the portion 41 entering the bore of the bearing so as to center the latter, in conjunction with the recess concavity, in axial alignment with the port 14. The clamp plug 39 is journaled on the lower end of a clamp screw 42 threadedly engaged in a nut member 43 forming part of a yoke 44 which is mounted for pivotal movement on the body 6. Said connection between the plug 39 and screw 42 is provided for by means of a set screw 40 mounted in the plug 39 and engageable with a peripheral groove 45 disposed in the lower and unthreaded end portion 50 of the clamp screw. The plug has a central bore for receiving the portion 50 and it will be clear that by means of the foregoing arrangement, rotary movement of the screw 42 will impart a vertical movement to the clamp plug 39. The pivotal mounting of the yoke is effected by providing the ends of the yoke arms with apertured eyes 46 journaled on studs 47 which extend through apertures 48 drilled horizontally of cylindrical spuds 49 secured to and extending at diametrically opposed points from the body 6. The studs 47 have enlarged heads 51 at their inner ends which serve the dual purposes of preventing outward displacement of the former in the spud bores and forming stops against which the piston 19 may strike to limit the latter's downward movement. A pair of stop pins 52 secured to and extending from the body on both sides of one of the yoke arms limits the degree of swing of the yoke between positions wherein the clamp plug 39 is swung clear of the cap 11. The wing members 53 carried by the clamp screw 42 are provided for forcing the clamp plug 39 into such forcible engagement with the bearing 38 that the inner ring of the latter is sealed against the surface of the recess 16. It will be noted however, that due to the mounting of plug 39, rotation of wing members 53 will result only in vertical movement of the plug, thereby eliminating the possibility of injuring the inner race of the bearing if the plug was permitted to rotate relative thereto when the plug and bearing were in contiguous relation. It will be seen therefore that when pressure is applied to the grease in the chamber by upward movement of the piston 19, the only course left open for the grease to flow along after issuing from the port 14 is through the annular space of the bearing containing the balls or rollers and their spacing retaining cage. The first appearance of a flow of grease between the upper end of the bearing 38 and the conical face 41 of the clamp plug is indicative of the fact that the annular space of the bearing has become sufficiently full of grease whereupon the bearing may be removed from the apparatus by releasing the screw pressure on the clamp plug and swinging aside the yoke.

During times that the apparatus is not in use, the clamp plug 39 is firmly seated in the recess 16 so as to seal the port 14 and thus prevent settling on the exposed grease of gritty particles which might be deposited in a bearing during a subsequent greasing operation and cause severe damage to the bearing when the latter is returned to operation.

With the apparatus above described it is possible to grease bearings ranging from comparatively small sizes having an external diameter only slightly larger than that of the port 14 to the larger sizes whose external diameters do not exceed the diameter of the recess 16. It is also possible to satisfactorily charge the bearings with the various viscosities of grease ranging from the more fluid varieties recommended for the smaller bearings to the heavy slow-flowing types used in the larger bearings and requiring as much as a ton or more of pressure by the jack 27 to force into the bearing.

The previously described form of my invention is designed for use particularly with bearings such as those of the ball or straight roller type in which the inner and outer rings or races are not separable from the bearing cage so that the bearing as a unit must be removed from its operative mounting. In Figure 3 I have shown means whereby bearings of the separable type such as the taper roller variety commonly employed as journals for vehicle wheels may be greased both inwardly and outwardly of the bearing cage. Here I provide a sheet metal adapter, sized to fit the particular bearing to be greased, having a circular top wall member 54 formed with a central conical depression 56 fitting over the apex of the clamp plug 39 and provided with a downwardly extending peripheral skirt 57 which just radially clears the outer diameter of the roller assembly and which approaches and is spaced at its lower end from the surface of the recess 16 to form a gap 58. The inner ring 59 of the bearing rests against the underside of the wall member 54 about the point of intersection of the said underside with the cone-shaped portion defining the depression 56 and the proportions are such that the lower edge of the bearing cage bears against the recess surface 16. This creates an arrangement wherein grease under pressure after issuing from the port 14 flows upwardly between the inner face of the bearing cage 61 and the confronting face of the inner bearing ring 59, thence radially outwardly between the top edge of the bearing cage and the bottom surface of the wall member 54, and thence downwardly between the outer face of the bearing cage and the inner surface of the skirt 57. The first appearance of grease flow through the gap 58 is indication that the bearing has been fully grease packed both interiorly and exteriorly of the bearing cage. As far as I am aware there is no grease packing apparatus which will, at one operation, deposit an application of grease to both sides of the cage element of a bearing section as illustrated in Figure 3. The present practice is to pressure pack the inner space between the cage and inner ring 59 and thereafter manually smear grease externally of the cage.

I claim:

1. In ball and roller type bearing greasing apparatus provided with a cylinder enclosing a chamber for grease and having a piston in said chamber, a cap member provided with a centrally disposed substantially unobstructed discharge port on one end of said cylinder through which grease may be forced on movement of said piston, said cap member having a conically shaped depression bordering said discharge port, a non-ported clamp plug overlying said cap member depression and having a portion thereof shaped complementary with said depression between which and the surface of the depression a bearing may be engaged and positioned in substantial axial alignment with said discharge port, means remote from said cap member and said discharge port for imparting unidirectional motion to said clamp plug thereby selectively urging said plug toward and away from said bearing, and said complementary portion of the clamp plug and the surface of said depression cooperating to form a sealing closure for said chamber when no bearing is placed therebetween.

2. In ball and roller type bearing greasing apparatus provided with a cylinder enclosing a chamber for grease and a cap member provided with an unobstructed discharge port on one end of said cylinder through which grease may be forced by movement of a piston in said chamber, said cap member having a lower surface inclined inwardly and downwardly toward said discharge port, a clamp plug overlying said cap member and having a lower portion thereof shaped complementary with an upper surface of said cap member, means independent of said cap member for effecting movement of said clamp plug from and towards said cap member thereby sealing the discharge port when said lower portion of the clamp plug is in contiguous relationship with said upper surface of the cap member, said means including a rotatable member journalled to said clamp plug, said cap member and clamp plug arranged to receive a bearing therebetween in substantial axial alignment with said discharge port, and said plug movement means effecting movement of the plug in only an upward or downward direction.

ROGER G. IVIE.

REFERENCES CITED

The following references are of record in the file of this patent:

UNITED STATES PATENTS

| Number | Name | Date |
| --- | --- | --- |
| 2,137,660 | Welke | Nov. 22, 1938 |
| 2,168,746 | Saal | Aug. 8, 1939 |
| 2,174,769 | White | Oct. 3, 1939 |